(12) United States Patent
Forster et al.

(10) Patent No.: US 8,083,151 B2
(45) Date of Patent: Dec. 27, 2011

(54) RFID TAG THAT PROVIDES A FLAT PRINT AREA AND A PINCH THAT ENABLES THE SAME

(75) Inventors: Ian James Forster, Essex (GB); Scott Wayne Ferguson, Pasadena, CA (US)

(73) Assignee: Avery Dennison Corporation, Pasadena, CA (US)

( * ) Notice: Subject to any disclaimer, the term of this patent is extended or adjusted under 35 U.S.C. 154(b) by 214 days.

(21) Appl. No.: 12/430,920

(22) Filed: Apr. 28, 2009

(65) Prior Publication Data
US 2009/0205515 A1    Aug. 20, 2009

Related U.S. Application Data

(62) Division of application No. 11/144,470, filed on Jun. 2, 2005, now Pat. No. 7,571,862.

(51) Int. Cl.
G06K 19/00  (2006.01)
G06K 19/06  (2006.01)
G06K 7/10   (2006.01)
G08B 13/14  (2006.01)

(52) U.S. Cl. ............ 235/492; 235/487; 235/472.02; 340/572.1; 340/572.8

(58) Field of Classification Search ............ 156/300; 101/35; 235/487, 492, 472.02; 340/572.1, 340/572.8
See application file for complete search history.

(56) References Cited

U.S. PATENT DOCUMENTS

| | | | |
|---|---|---|---|
| 4,671,839 A * | 6/1987 | Finkel et al. | 156/257 |
| 5,026,452 A | 6/1991 | Kodai | |
| 5,184,149 A * | 2/1993 | Tanaka et al. | 346/74.2 |
| 5,250,341 A | 10/1993 | Kobayashi et al. | |
| 5,867,102 A | 2/1999 | Souder et al. | |
| 5,982,284 A * | 11/1999 | Baldwin et al. | 340/572.8 |
| 6,100,804 A | 8/2000 | Brady et al. | |
| 6,262,692 B1 | 7/2001 | Babb | |
| 6,265,977 B1 | 7/2001 | Vega et al. | |
| 6,294,998 B1 | 9/2001 | Adams et al. | |
| 6,296,032 B1 * | 10/2001 | Louie et al. | 156/387 |
| 6,369,711 B1 * | 4/2002 | Adams et al. | 340/572.1 |
| 6,391,136 B1 | 5/2002 | Stickelbrocks | |
| 6,451,154 B1 * | 9/2002 | Grabau et al. | 156/300 |

(Continued)

OTHER PUBLICATIONS

Invitation to Pay Additional Fees issued in corresponding PCT/US2006/021091 dated Oct. 2, 2006.

(Continued)

*Primary Examiner* — Daniel Walsh (57) ABSTRACT

A radio-frequency identification (RFID) tag includes a face stock and an RFID device. The face stock has a printable side and an inlay side, with the RFID device mounted to the inlay side. A layer of adhesive is coated on the inlay side of the face stock. A liner is releasably adhered to the layer of adhesive and includes a relief area that accommodates for defection of the RFID device. The accommodation of the thickness of the RFID device results in a tag that has a substantially uniform printable surface. Accordingly, when passing through a printer, the printable surface is maintained substantially flat or linear at the print head of the printer, thereby minimizing jamming and enhancing printability. A pinch roller for a printer also accommodates for deflection of the RFID tag by providing a deformable section along a length thereof the body that has a greater resiliency than the rest of the body. At the location of the RFID device, the layer of adhesive may also include a blank that is substantially free of adhesive for accommodating the RFID device.

7 Claims, 6 Drawing Sheets

U.S. PATENT DOCUMENTS

| | | |
|---|---|---|
| 6,491,227 B2 | 12/2002 | Izumi et al. |
| 6,569,508 B2 | 5/2003 | Babb et al. |
| 6,836,215 B1 * | 12/2004 | Laurash et al. ............ 340/572.1 |
| 6,911,911 B2 | 6/2005 | Surkau et al. |
| 6,995,674 B2 | 2/2006 | Turner et al. |
| 7,014,729 B2 * | 3/2006 | Grabau et al. ................ 156/290 |
| 7,045,186 B2 * | 5/2006 | Grabau et al. ................ 428/40.1 |
| 7,116,231 B2 | 10/2006 | Kayanakis et al. |
| 7,135,979 B2 | 11/2006 | Savagian et al. |
| 7,141,451 B2 * | 11/2006 | Tsunoda et al. .............. 438/113 |
| 7,170,415 B2 * | 1/2007 | Forster ........................ 340/572.4 |
| 7,224,278 B2 * | 5/2007 | Phaneuf et al. ............. 340/572.1 |
| 7,352,381 B2 * | 4/2008 | Nakanishi ...................... 347/206 |
| 7,571,862 B2 * | 8/2009 | Forster et al. ................ 235/492 |
| 7,641,606 B2 * | 1/2010 | Watanabe ....................... 492/10 |
| 7,656,298 B2 * | 2/2010 | Nagae et al. ............... 340/572.8 |
| 7,694,883 B2 * | 4/2010 | Ohashi et al. ................. 235/487 |
| 2002/0036237 A1 * | 3/2002 | Atherton et al. .............. 235/492 |
| 2002/0135481 A1 * | 9/2002 | Conwell et al. ............ 340/572.1 |
| 2002/0152860 A1 | 10/2002 | Machamer |
| 2002/0195194 A1 * | 12/2002 | Grabau et al. ................ 156/300 |
| 2002/0195195 A1 * | 12/2002 | Grabau et al. ................ 156/300 |
| 2003/0038174 A1 | 2/2003 | Jones |
| 2003/0062119 A1 * | 4/2003 | Hohberger et al. ........... 156/277 |
| 2003/0063001 A1 * | 4/2003 | Hohberger et al. ........ 340/572.1 |
| 2003/0063139 A1 * | 4/2003 | Hohberger et al. ................ 347/2 |
| 2003/0197064 A1 | 10/2003 | Saint et al. |
| 2004/0004131 A1 | 1/2004 | Emmert |
| 2004/0094949 A1 | 5/2004 | Savagian et al. |
| 2004/0104274 A1 * | 6/2004 | Kotik et al. ................... 235/492 |
| 2004/0169086 A1 | 9/2004 | Ohta et al. |
| 2005/0021172 A1 * | 1/2005 | Winter et al. ................. 700/228 |
| 2005/0091821 A1 * | 5/2005 | Best et al. ....................... 29/430 |
| 2005/0093700 A1 | 5/2005 | Carrender |
| 2005/0101060 A1 | 5/2005 | Tsunoda et al. |
| 2005/0128086 A1 * | 6/2005 | Brown et al. ............... 340/572.8 |
| 2005/0134464 A1 * | 6/2005 | Redlin ........................ 340/572.8 |
| 2006/0028344 A1 | 2/2006 | Forster |
| 2006/0065745 A1 * | 3/2006 | Kawai ........................... 235/492 |
| 2006/0092026 A1 | 5/2006 | Lawrence et al. |
| 2006/0109118 A1 | 5/2006 | Pelo et al. |
| 2006/0118229 A1 * | 6/2006 | Ohashi et al. ................... 156/60 |
| 2006/0125641 A1 * | 6/2006 | Forster ....................... 340/572.8 |
| 2006/0145860 A1 | 7/2006 | Brown et al. |
| 2006/0176181 A1 | 8/2006 | Halope |
| 2006/0187057 A1 | 8/2006 | Yang |
| 2006/0273170 A1 * | 12/2006 | Forster et al. ................. 235/432 |
| 2006/0290498 A1 * | 12/2006 | Rawlings et al. .......... 340/572.1 |
| 2006/0290513 A1 | 12/2006 | Shanton |
| 2006/0292316 A1 | 12/2006 | Conwell et al. |
| 2007/0085685 A1 * | 4/2007 | Phaneuf et al. ............. 340/572.8 |
| 2007/0138281 A1 * | 6/2007 | Moriyama et al. ............ 235/451 |
| 2007/0151660 A1 | 7/2007 | Adams et al. |
| 2007/0171129 A1 | 7/2007 | Coleman et al. |
| 2007/0204493 A1 | 9/2007 | Foley et al. |
| 2007/0210924 A1 | 9/2007 | Arnold et al. |
| 2007/0216534 A1 | 9/2007 | Ferguson et al. |
| 2007/0283556 A1 | 12/2007 | Wehr |
| 2008/0084307 A1 | 4/2008 | Peter et al. |
| 2008/0117056 A1 | 5/2008 | Forster |
| 2008/0180217 A1 * | 7/2008 | Isabell ........................ 340/10.1 |
| 2008/0202300 A1 | 8/2008 | Steidinger et al. |
| 2008/0204250 A1 * | 8/2008 | Baba et al. ................. 340/572.7 |
| 2009/0072974 A1 * | 3/2009 | Miyashita et al. ......... 340/572.1 |
| 2009/0201158 A1 * | 8/2009 | Kato et al. ................. 340/572.7 |
| 2010/0011978 A1 * | 1/2010 | Whitelaw et al. ............. 101/130 |

OTHER PUBLICATIONS

International Preliminary Report on Patentability issued in corresponding PCT/US2006/021091 dated Dec. 21, 2007.

International Search Report and Written Opinion issued in corresponding PCT/US2006/021091 dated Dec. 13, 2006.

* cited by examiner

RFID TAG THAT PROVIDES A FLAT PRINT AREA AND A PINCH THAT ENABLES THE SAME

CROSS-REFERENCE TO RELATED APPLICATION

This application is a division of U.S. application Ser. No. 11/144,470 filed Jun. 2, 2005, which is incorporated herein by reference in its entirety.

FIELD OF THE INVENTION

The present invention relates to radio-frequency identification (RFID) tags. The invention also relates to RFID tags with enhanced printing capabilities.

BACKGROUND OF THE INVENTION

Conventional RFID tags have a substrate or face stock on one side of which an RFID device, chip, or strap is mounted. An adhesive layer is coated over the RFID device, and a release liner is applied to the adhesive layer. Accordingly, there is an uneven thickness in the RFID tag at the location of the RFID device, chip, or strap, such that the RFID tag bulges at this location.

It is common to print information on the RFID tag after the tag has been manufactured, either by the manufacturer or by the end user. However, because of the uneven thickness, when passing through a printer during a printing process, the RFID tag has a tendency to jam in the printer or to otherwise present an undesirable printing surface for the print head of the printer, thereby resulting in print distortion and less than optimal printing. In addition, compressing the RFID tag between the pinch roller and the print head may damage the RFID device and associated inlayed structure or may damage the print head itself, thereby decreasing the life of the print head.

In view of the foregoing, there is a need in the art for RFID tags that mitigate or eliminate the problems associated with printing on conventional tags. The present invention satisfies this need.

BRIEF SUMMARY OF THE INVENTION

In accordance with exemplary embodiments of the present invention, radio-frequency identification (RFID) tags enable efficient, reliable printing by providing tags that are effectively flat along their transverse axis as they pass below the print head during the printing process.

According to one aspect of the invention, an RFID tag includes a face stock and an RFID device. The face stock has a printable side and an inlay side, with the RFID device mounted to the inlay side. A layer of adhesive is coated on the inlay side of the face stock. A liner is releasably adhered to the layer of adhesive and includes a relief area that is coincident with or located at the RFID device. The relief area may include a plurality of weakening lines, such as scored or die cut lines in the liner, that enable the liner to flex or separate when the RFID tag is compressed to accommodate any deflection of the RFID device. In other embodiments, the relief area includes a seat for accommodating the RFID device.

According to another aspect, the layer of adhesive includes a blank that is substantially free of adhesive at the location of the RFID device. The blank essentially provides a recess that effectively accommodates the thickness of the RFID device, thereby resulting in a tag that has a substantially uniform thickness. Accordingly, when passing through a printer, the printable surface is maintained substantially flat or linear at the print head of the printer, thereby minimizing jamming and enhancing printability.

According to still another aspect, a pinch roller for a printer also accommodates any unevenness in the print surface of the RFID tag when passing through a printer. The pinch roller includes a body that is rotatable about a transverse axis and a deformable section disposed along a length of the body. The deformable section deforms to a greater degree than the rest of the body in a normal direction that is orthogonal to the transverse axis. Accordingly, when an RFID tag with an uneven thickness passes through the printer, the deformable section of the pinch roller accommodates the unevenness by compressing or deflecting in the normal direction.

Other features and advantages of the present invention will become apparent to those skilled in the art from a consideration of the following detailed description taken in conjunction with the accompanying drawings.

DETAILED DESCRIPTION OF THE INVENTION

Figure 1:
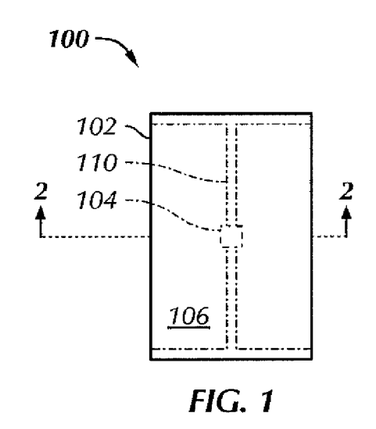
FIG. 1 is a plan view of an exemplary embodiment of an RFID tag that compensates for a thickness of an RFID device.
Figure 2:
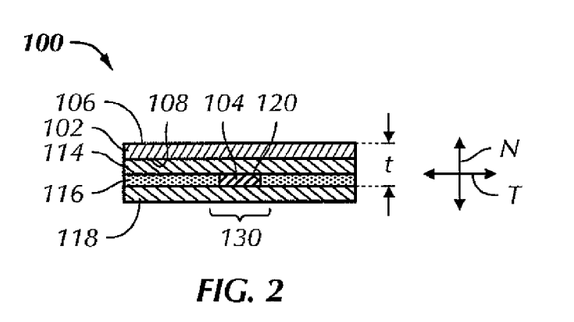
FIG. 2 is a cross-sectional view taken along line 2-2 of FIG. 1.

Referring more particularly to FIGS. 1 and 2 of the drawings, a radio-frequency identification (RFID) tag 100 includes a face stock 102 and an RFID device 104. The face stock 102 may be described as having a printable side or surface 106 and an inlay side or surface 108. The RFID device 104 is mounted to or disposed on the inlay side 108 of the face stock 102 and may include any type of RFID structure, including chips, straps, power source (for active devices), and connecting structure for coupling with an antenna 110, as known in the art.

The face stock 102 may include an inlay substrate 114, such as a layer of polyethylene terephthalate (PET), applied to the inlay side 108 on which the RFID device 104 (such as a microchip) and the antenna 110 may be disposed. In addition, a layer of adhesive 116, such as a pressure sensitive adhesive (PSA), may be coated on the inlay side 108 of the face stock 102, and a liner 118 may be releasably adhered to the layer of adhesive 116.

Figure 3:
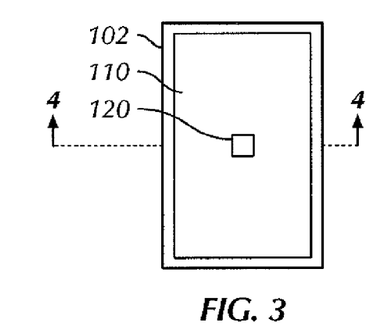
FIG. 3 is a plan view of a layer of adhesive of an RFID tag.
Figure 4:
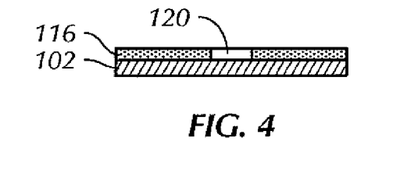
FIG. 4 is a cross-sectional view taken along line 4-4 of FIG. 3.

With additional reference to FIGS. 3 and 4, according to a number of embodiments, the layer of adhesive 116 may include a blank 120 formed or defined therein that is substantially free of adhesive, as particularly shown in FIG. 4. The blank 120 may be described as being spatially larger than and coincident with the RFID device 104 so that the RFID device 104 is received or located therewithin, as particularly shown in FIG. 2. Alternatively, the blank 120 may be described as being disposed on the inlay side 108 of the face stock 102 and defining an area that is substantially free of adhesive and in which the RFID device 104 is disposed. Depending on the respective thicknesses of the RFID device and the adhesive, it may be seen that the blank 120 can compensate for the thickness of the RFID device 104, either partially or completely, as described below.

For the purposes of this description, the word blank indicated by reference numeral 120 is used to describe an area or region in the layer of adhesive 116 that is free of adhesive. This spatial void in the layer of adhesive 116 may be alternatively described as, for example, a window, an opening, an aperture, or a seat in the adhesive 116.

Figures 5, 6:
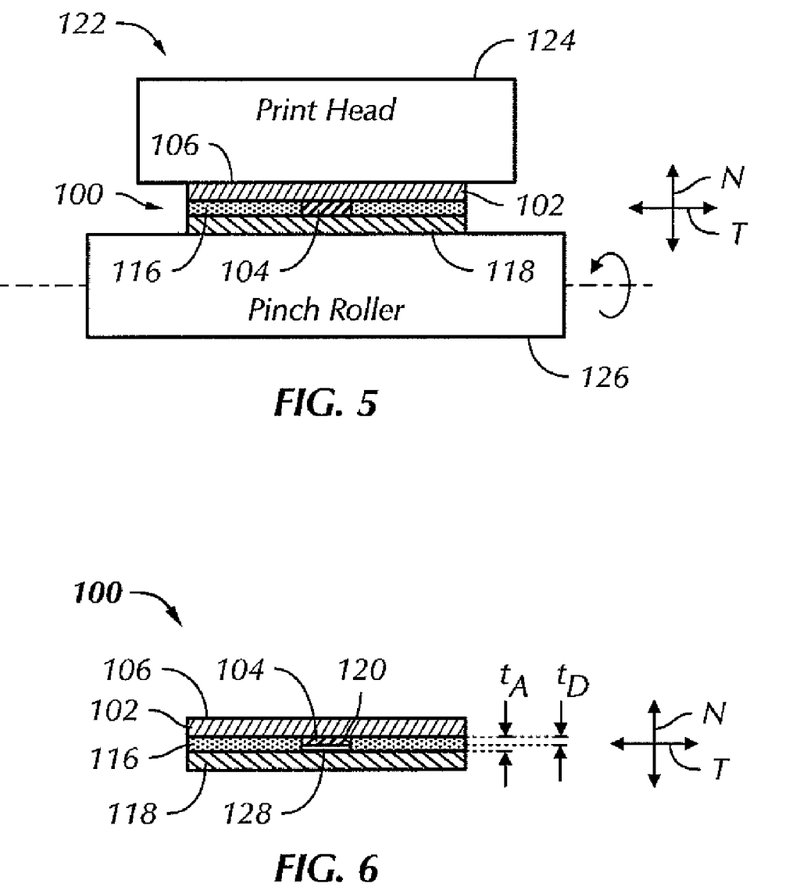
FIG. 5 illustrates a printing process utilizing an RFID tag with a substantially uniform thickness.
FIG. 6 is a cross-sectional view illustrating some of the embodiments of a layer of adhesive.

Thus, in some of the embodiments, the tag 100 may be configured so that a thickness t is substantially uniform along a transverse axis T, as shown in FIG. 2. Accordingly, when the tag 100 is passing through a printer 122 with a print head 124 and a pinch roller 126, as shown in FIG. 5, the printable side 108 of the face stock 102 remains substantially linear, or flat, along the transverse axis T of the tag as it passes between the two. In other words, any deflection of or upset in the printable side 108 of the face stock 102 caused by the RFID device 104 is minimized or substantially eliminated, thereby maintaining a printing area of the tag 100 essentially flat to enhance printing.

In other embodiments, such as shown in FIG. 6, the layer of adhesive 116 may have a thickness $t_A$ that is slightly greater than a thickness $t_D$ of the RFID device 104 so that the device 104 is effectively sunken within the blank 120, leaving a small recess 128. The recess 128 may provide spatial or directional accommodation in a normal direction N when the tag 100 is compressed between a print head and a pinch roller in a printer due to differing resiliency between the adhesive 116 and the RFID device 104.

Figure 7:
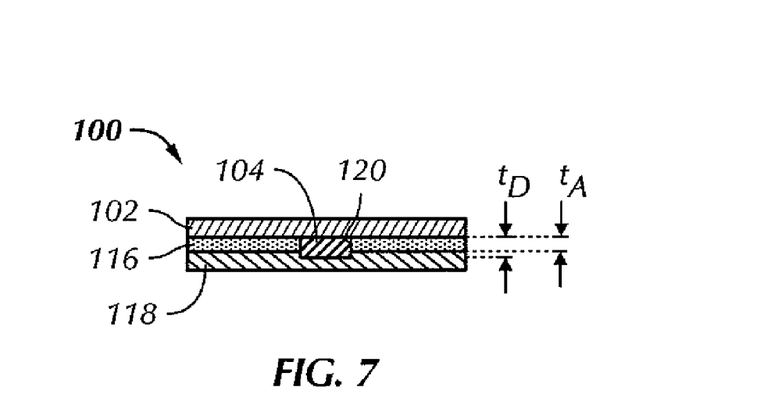
FIG. 7 is a cross-sectional view illustrating other embodiments of a layer of adhesive.
Figure 8:
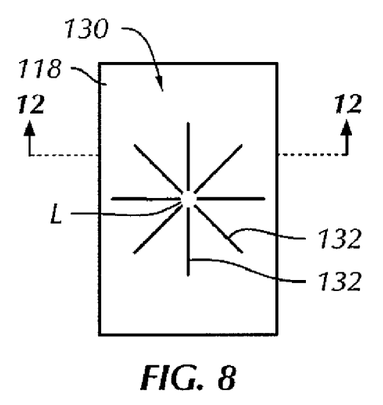
FIGS. 8, 9, 10, and 11 are plan views respectively illustrating alternative embodiments of a liner with a deformable section.
Figure 9:
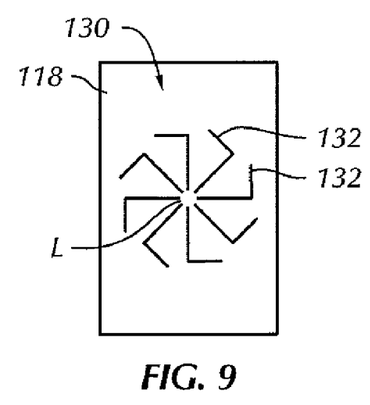
Figure 10:
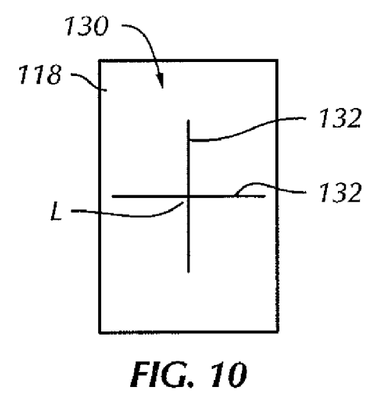
Figure 11:
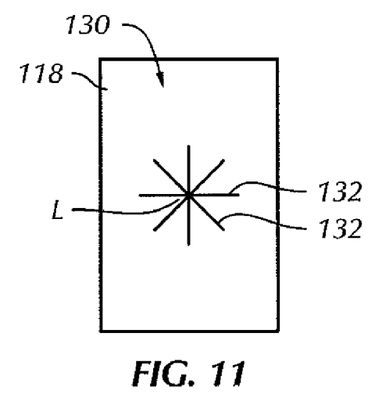

In still other embodiments, such as shown in FIG. 7, the layer of adhesive 116 may have a thickness $t_A$ that is slightly less than a thickness $t_D$ of the RFID device 104 so that the device 104 projects out of the blank 120 slightly. In such an embodiment, additional spatial accommodation in the normal direction N can be accomplished by providing a liner 118 with accommodating structure, as described below.

More specifically, in a number of embodiments, such as the alternative embodiments respectively shown in FIGS. 8, 9, 10, and 11, the liner 118 may include a relief area 130 centered about or coincident with the location of the RFID device 104 (not shown in these figures; see, e.g., FIG. 2), which location is indicated by L. In some of the embodiments, the relief area 130 may include one or more weakening lines 132.

Figure 12:
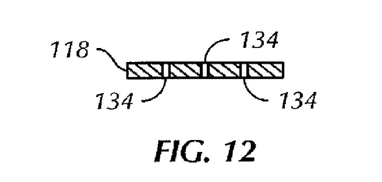
FIG. 12 is a cross-sectional view taken along line 12-12 of FIG. 8.
Figure 13:
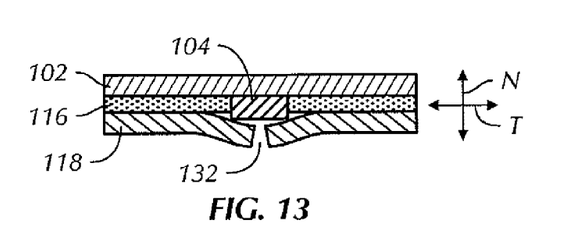
FIG. 13 is a cross-sectional view illustrating a relief area of a liner flexing under deflection from an RFID device.

The weakening lines 132 may include surface scores (i.e., cuts into but not extending through the liner 118) or, alternatively, may include die cuts 134 that extend completely through the thickness of the liner as shown in FIG. 12. The weakening lines 132 accommodate deflection of the RFID device 104 in the normal direction by allowing or enabling the liner 118 to separate and flex in the normal direction N under compression, as shown in FIG. 13.

As examples of commercial embodiments, the thickness of the liner 118 may range from about 2 mil to about 8 mil, and the thickness of the RFID chip 104 may range from about 5 mil to about 10 mil. For example, if the device or chip 104 is about 5 mil, then the liner 118 may be selected to be about 8 mil.

Figure 13A:
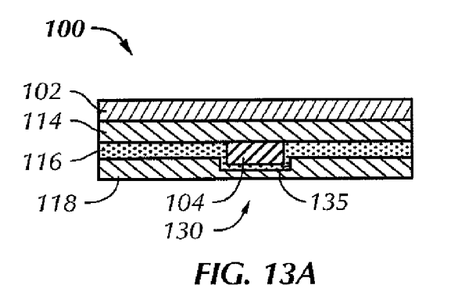
FIG. 13A is a cross-sectional view illustrating a liner with a seat for accommodating an RFID device.
Figure 13B:
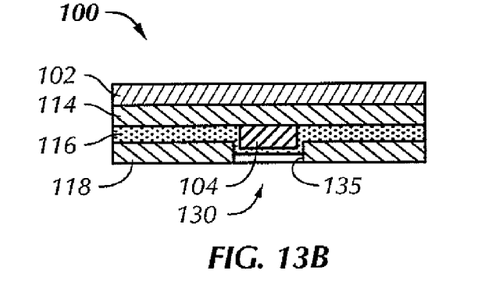
FIG. 13B is a cross-sectional view illustrating a liner with an opening for accommodating an RFID device.

In this regard, rather than providing a blank 120 in the adhesive layer 116, a recess or seat 135 may be formed in the liner 118 at the location of or coincident with the RFID device 104 as shown in FIG. 13A. In some of the embodiments, the seat 135 may be spatially larger than the RFID device 104 so that the device 104 is received within the seat as shown. These embodiments may be described in that the relief area 130 includes the seat 135. In these embodiments, the layer of adhesive 116 is relatively thin, with the thickness of the liner 118 being greater than the thickness of the device 104. Accordingly, the device 104 is accommodated by the seat 135 of the liner 118. Also in these embodiments, the relief area 130 may also include the weakening lines 132 in addition to the seat 135, if desired. In still other embodiments, the seat 135 may be in the form of a blank as described above in which the seat 135 is in the form of an opening through the liner 118, as shown in FIG. 13B.

For the purposes of this description, the term relief area is used to describe an area or structure of the tag 100 that enables distortion of the tag 100 when under stress or that allows the RFID device 104 to deflect under force, thereby entering the original or normal volume of the liner 118. The distortion or deflection may be either permanent or temporary.

Figure 14:
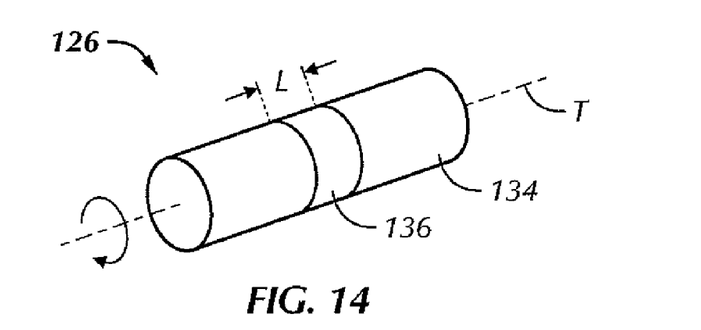
FIG. 14 is a perspective view of pinch roller for a printer.
Figure 15:
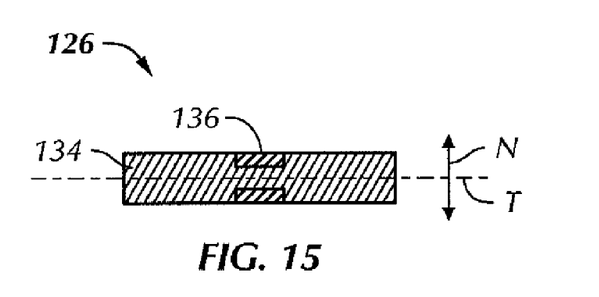
FIG. 15 is a cross-sectional view of the pinch roller.

In still other embodiments, accommodation of deflection of an RFID tag in the normal direction N may be accomplished by a pinch roller 126 as shown in FIGS. 14 and 15. The pinch roller 126 includes a body 134 that is rotatable about a transverse axis T. In a number of embodiments, the body 134 may include a deformable section 136 disposed along a length L thereof.

The deformable section 136 is configured to deform to a greater degree in response to a given force than the rest of the body 134. In other words, the deformable section 136 is deformable, deflectable, or compressible to a greater degree than the rest of the body 134 in the normal direction N that is orthogonal to the transverse axis T. In addition, the deformable section 136 may also be resilient in that the deformable section 136 is able to resume its original shape or position after being compressed or deformed. In a number of embodiments in which an elastic or resilient material is used, the deformable section 136 may be described as being "softer" than the rest of the body 134.

In some of the embodiments, the deformable section 136 may include foams such as closed-cell foams. In other embodiments, the deformable section 136 may be implemented with an electrically controllable material, such as an electro-active polymer with controllable parameters that can be softened at the deformable section 136 on command.

Figure 16:
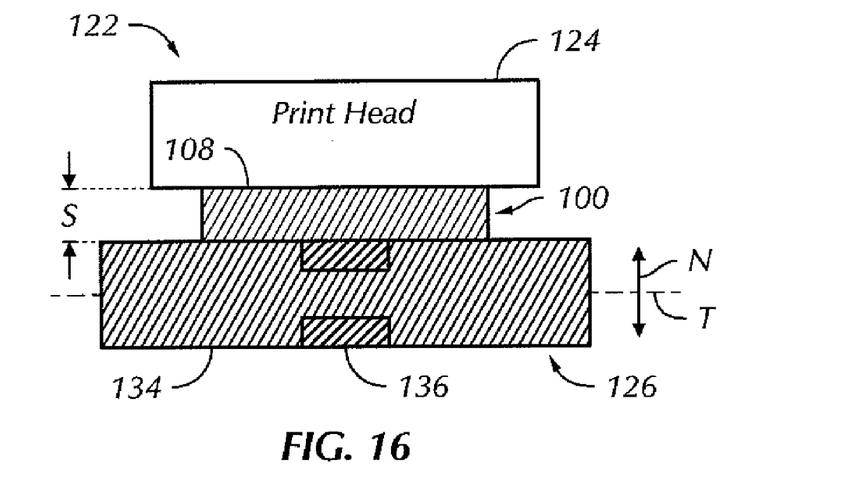
FIG. 16 illustrates a printing process utilizing a pinch roller with a deformable section and an RFID tag with substantially uniform thickness.

More specifically, as shown in FIG. 16, in a printing process in which the tag 100 has a uniform thickness in the normal direction N, and therefore, does not deflect in the normal direction N, the deformable section 136 does not defect in the normal direction N, and the printing side 108 is maintained substantially linear or flat along the transverse axis T for printing by the print head 124.

Figure 17:
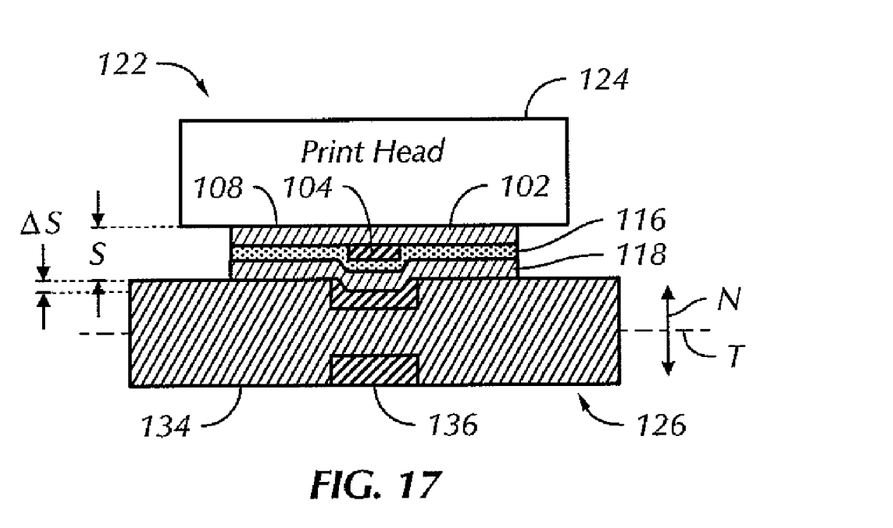
FIG. 17 illustrates a printing process utilizing a pinch roller with a deformable section and an RFID tag that has a greater thickness at the location of an RFID device.

However, in a printing process in which the tag 110 does not have a uniform thickness and, therefore, deflects in the normal direction N when compressed between the print head 124 and the pinch roller 126, as shown in FIG. 17, the deformable section 136 correspondingly deflects in the normal direction N to accommodate the deflection of the RFID tag 100. Accordingly, a substantially linear or flat printing surface 108 is maintained along the transverse axis T for printing by the print head 124.

In other words, a normal separation S may be defined between the print head 124 and the pinch roller 126 in a normal, non-deflecting printing process. In a printing process in which an RFID tag 100 has a greater thickness at a location of an RFID device 104, thereby resulting in deflection, then the pinch roller 126 can accommodate this greater thickness at the location of the RFID device 104 by increasing the separation S between the print head 124 and the pinch roller 126 by a defection separation ΔS, thereby maintaining the printable side 108 of the face stock 102 substantially linear or flat along the transverse axis T. The deformation of the deformable section 136 is temporary in that after the tag 100 has passed through the printer, the deformable section 136 returns to a normal condition under the resiliency thereof.

Those skilled in the art will understand that the preceding embodiments of the present invention provide the foundation for numerous alternatives and modifications thereto. For example, rather than a single deformable section 136 along the body 134 of the roller 126, a plurality of such deformable sections may be provided. Alternatively, the entire length of the body 134 of the roller 126 may be made from a material that is substantially resilient to accommodate any local deflection of the printing stock or RFID tag 100. These other modifications are also within the scope of the present invention. Accordingly, the present invention is not limited to that precisely as shown and described in the present invention.

What is claimed is:

1. A method of printing on an RFID tag in a printer, the RFID tag including a face stock with a printable side and an inlay side and an RFID device disposed on the inlay side of the face stock such that the RFID tag has a greater thickness at the location of the RFID device than at other areas of the RFID tag, the printer including a print head and a pinch roller with a given separation therebetween, a transverse axis being defined along a length of the pinch roller and orthogonal to a print path of the printer, the method comprising:

maintaining the printable side of the face stock substantially linear along the transverse axis while the RFID tag is passing through the printer, wherein the maintaining step further comprises the pinch roller having at least one area capable of undergoing a deformation in a normal direction that is orthogonal to the transverse axis, the at least one area corresponding to the location of the RFID device and the greater thickness, and electronically deforming the at least one area corresponding with the location of the RFID device, and wherein the at least one area is operable to be electronically changed based on the location of an RFID and area of greater thickness in an RFID tag.

2. The method of claim 1 wherein the maintaining step further comprises maintaining the printing surface of the face stock substantially linear while the RFID tag is passing between the pinch roller and the print head.

3. The method of claim 2 wherein the maintaining step further comprises maintaining the printing surface of the face stock substantially linear at the location of the RFID device.

4. The method of claim 2 wherein the maintaining step further comprises adjusting separation between the print head and the pinch roller at an area where the RFID device passes therebetween while maintaining the given separation between the print head and the pinch roller at other areas.

5. The method of claim 1, wherein the deformation is a reversible deformation.

6. The method of claim 1, wherein the area of deformation is the area wherein the RFID device passes therebetween the pinch roller and printhead.

7. The method of claim 1, wherein the area of deformation is the entire length of the roller.

\* \* \* \* \*